Patented Jan. 26, 1943

UNITED STATES PATENT OFFICE 2,309,254

FUR TREATING COMPOSITION AND PROCESS

William Page, Cranford, N. J.

No Drawing. Application November 28, 1940,
Serial No. 367,573

2 Claims. (Cl. 8—112)

The present invention is concerned with the production of fur which may be readily processed into felt of improved quality. The invention especially relates to an improved so-called "carroting process" by which rabbit, hare, beaver, and similar types of fur are treated, utilizing as a carroting solution an aqueous mixture comprising zinc sulphate, an oxidizing agent, and a particular hydrolyzing agent consisting of sulphuric acid and nitric acid. In accordance with the present process, a carroted fur is produced which may be readily processed into a smooth, strong, tight felt which will exhibit substantially improved wearing qualities. My process is particularly desirable in that the resulting product is of a higher quality than has heretofore been secured and that this product is secured in an economical and efficient process which is entirely innocuous with respect to the health of the operating personnel. This application contains subject matter in common with and is a continuation-in-part of application No. 318,324, filed February 10, 1940, in the name of Page et al., now Patent Number 2,225,843 dated December 24, 1940.

It is well known in the art to process animal fur, particularly rabbit, hare, beaver, and similar types of fur, by a carroting process which generally comprises treating the fur with an aqueous solution of mercuric nitrate and nitric acid. This solution is usually applied to the fur while still on the pelt although it may be applied after removal of the fur from the pelt. The fur is then dried at temperatures ranging from atmospheric to temperatures as high as 250° F. or higher, depending upon the nature of the fur and the type and quality of final treated product desired. The drying conditions vary considerably, depending to a large extent upon the particular fur being processed, the carroting solution employed, as well as upon general atmospheric and other related conditions. However, due to the fact that mercury and mercury salts are toxic in nature and may adversely affect the health of the operating personnel in contact with felting processes and related arts, it has been suggested that various non-mercuric carroting solutions be substituted for the mercuric carroting solutions. In general, these mercury-free solutions comprise an oxidation agent, as for example chloric acid, bromic acid, iodic acid, permanganic acid, hydrogen peroxide, and the like, and a hydrolyzing agent, such as sulfuric acid, acids of phosphorus, or equivalent acids which function to duplicate the oxidation and hydrolyzing effects secured by the nitric acid present in the mercuric nitrate solution.

The hydrolyzing agents in general are characterized by having a high ionization value and by being relatively non-volatile at drying temperatures. Desirable hydrolyzing agents, furthermore, are relatively stable so that side reactions resulting in the consumption of the agent do not occur during the processing. Particular non-mercuric carroting solutions which have been suggested are, for example, a solution comprising an oxidation agent such as permanganic acid and a hydrolyzing agent which is preferably sulfuric acid or a carroting solution in which the oxidizing agent is a peroxide, as for example, hydrogen peroxide. These solutions, in general, have not been commercially successful due in part to the fact that they have "slow starting" and "slow sizing" characteristics. It is also known that although certain desired results may be secured in the carroting process, provided the treating reagents are sufficiently strong and concentrated, other deleterious factors are encountered in that the life of the fiber is adversely affected, particularly with respect to its wearing ability and with respect to its ability to absorb color. Furthermore, when utilizing sulphuric acid as the hydrolyzing agent, increasing the concentrations of the same will tend to cause formation of tarry matter on the surface of the fiber giving it a burnt appearance and rendering it unsuitable for use. In order to overcome the disadvantages of this type of carroting solution, numerous inhibiting and catalytic agents have been introduced into respective non-mercuric solutions which have not produced material benefits, particularly with respect to duplicating the efficiency of the mercuric nitrate solution and the uniform quality of the resulting product.

I have now discovered a non-toxic carroting solution which may be efficiently employed for the production of a carroted fur of exceptionally high uniform quality. The carroted fur produced by my process is extremely stable and may be stored for long periods of time without any substantial deterioration of the fiber occurring. My carroted fur may be readily felted with an exceptionally low loss in weight during the felting operation. Furthermore, the felted product produced from my fur is smoothly and tightly interlaced, resulting in the production of a fabric having exceptionally fine, natural lustre and resiliency of the fibers, which in turn contributes to the appearance and wearing quality of the felt. My felt is also characterized in that it has the ability to absorb and indefinitely retain without fading all dye shades without objectionable overcast or other mottled effects or background.

The carroting solution of my invention comprises zinc sulphate, acetic acid, an oxidizing agent, and a particular hydrolyzing agent consisting of sulphuric acid and nitric acid. The oxidizing agent may comprise any known satisfactory oxidizing agent used in carroting processes, as for example, iodic acid, permanganic acid, hydrogen peroxide, and the like. In some instances, it may be desirable to employ hydrogen peroxide in combination with the zinc sulphate and the hydrolyzing agent consisting of sulphuric acid and nitric acid.

The hydrolyzing agent consists of sulphuric acid and nitric acid. The relative proportions of these constituents may vary considerably and will depend to an appreciable extent upon the fur to be carroted, as well as upon the concentrations and the particular oxidizing agent employed. In general, about 25% to 125% (by weight) preferably from about 50% to 100% of nitric acid based upon the sulphuric acid is employed. The nitric acid preferably has a specific gravity of about 1.530 and the sulphuric a density of 66° Bé., although equivalent results may be secured by adjusting the acid concentration and amounts used.

The concentration of the particular constituents in my carroting composition may vary considerably depending upon the reagents employed. For example, preferred compositions comprise from about 3 to 8% by weight, preferably from about 4 to 6% of zinc sulphate, from about 2 to 10% preferably from about 4 to 8% of 66° Bé. sulphuric acid, from about 2 to 10% preferably 3 to 9% of 1.530 nitric acid and from about 8 to 15% preferably 9 to 12% acetic acid. If hydrogen peroxide be employed, it is preferred that the concentration of the hydrogen peroxide based upon 100 volume hydrogen peroxide be in the range of about 3 to 8% by weight, preferably from about 4 to 6%. In certain instances, it may be desirable to employ from about 6 to 8% of tannic acid.

In order to further illustrate the invention the following examples are given which should not be construed as limiting the same in any manner whatsover:

Example

A number of carroting and felting operations were conducted utilizing various carroting solutions within the scope of the present invention. The compositions of these solutions were as follows:

| Preferred carroting solution—A: | Weight per cent |
|---|---|
| Zinc sulphate | 5.0 |
| Tannic acid | 8.0 |
| Acetic acid (28%) | 12.0 |
| Sulphuric acid, 66° Baumé | 4.0 |
| Hydrogen peroxide (100 volume) | --- |
| Nitric acid, S. G. 1.530 | 3.0 |

| Preferred carroting solution—B: | |
|---|---|
| Zinc sulphate | 4.0 |
| Tannic acid | 7.0 |
| Acetic acid (28%) | 11.0 |
| Sulphuric acid, 66° Baumé | 4.0 |
| Hydrogen peroxide (100 volume) | 8.0 |
| Nitric acid, S. G. 1.530 | 3.0 |

| Preferred carroting solution—C: | Weight per cent |
|---|---|
| Zinc sulphate | 4.0 |
| Tannic acid | 7.0 |
| Acetic acid (28%) | 11.0 |
| Sulphuric acid, 66° Baumé | 7.0 |
| Hydrogen peroxide (100 volume) | 4.0 |
| Nitric acid, S. G. 1.530 | 6.0 |

| Preferred carroting solution—D: | |
|---|---|
| Zinc sulphate | 4.0 |
| Tannic acid | 7.0 |
| Acetic acid (28%) | 11.0 |
| Sulphuric acid, 66° Baumé | 7.0 |
| Hydrogen peroxide (100 volume) | 8.0 |
| Nitric acid, S. G. 1.530 | 3.0 |

When utilizing the above carroting compositions, improved results were obtained with respect to the time necessary for shrinking and the amount of loss incurred. Furthermore, the felted fur had a good cast and fine appearance. These results were superior to the results obtained when employing solutions similar to those of the present invention with the exception that the nitric acid and the sulphuric acid were not employed in conjunction with each other.

From the above data it is apparent that the carroting solutions of the present invention possess distinct advantages and result in an improved product. The felted material furthermore is apparently impregnated in a manner with zinc which materially facilitates the shaping and sizing operations and results in the production of a product of a fine texture and lustre having improved properties with respect to its ability to retain its shape and wear for longer time periods under extremely adverse conditions.

The process of the present invention is not to be limited by any theory or mode of operation but only in and by the following claims by which it is desired to claim all novelty in so far as the prior art permits.

I claim:

1. A composition for carroting fur comprising 3 to 8% by weight of zinc sulphate, 8 to 15% by weight of 28% acetic acid, 6 to 8% by weight of tannic acid, 2 to 10% by weight of nitric acid, having a specific gravity of 1.530, 3 to 10% by weight of 66° Baumé sulphuric acid, and from about 3 to 8% by weight of 100 volume hydrogen peroxide.

2. A process for the production of fur which may be readily felted comprising treating fur with a carroting solution comprising 3 to 8% by weight of zinc sulphate, 8 to 15% by weight of 28% acetic acid, 6 to 8% by weight of tannic acid, 2 to 10% by weight of nitric acid having a specific gravity of 1.530, 3 to 10% by weight of 66° Baumé sulphuric acid, and from about 3 to 8% by weight of 100 volume hydrogen peroxide.

WILLIAM PAGE.